(12) United States Patent
Little et al.

(10) Patent No.: US 7,434,157 B2
(45) Date of Patent: Oct. 7, 2008

(54) PROGRAMMABLE OBJECT MODEL FOR NAMESPACE OR SCHEMA LIBRARY SUPPORT IN A SOFTWARE APPLICATION

(75) Inventors: Robert Little, Redmond, WA (US); Brian Jones, Redmond, WA (US); Marcin Sawicki, Kirkland, WA (US); Mark Sunderland, Seattle, WA (US); Edward W. Tharp, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 71 days.

(21) Appl. No.: 10/731,597

(22) Filed: Dec. 9, 2003

(65) Prior Publication Data

US 2005/0125720 A1    Jun. 9, 2005

(51) Int. Cl.
*G06F 17/00* (2006.01)
(52) U.S. Cl. ...................... 715/234; 715/255
(58) Field of Classification Search .............. 715/513, 715/234
See application file for complete search history.

(56) References Cited

U.S. PATENT DOCUMENTS

| | | | |
|---|---|---|---|
| 4,674,065 A | 6/1987 | Lange et al. ............... 382/311 |
| 4,868,750 A | 9/1989 | Kucera et al. ................ 711/2 |
| 5,020,019 A | 5/1991 | Ogawa ........................ 707/5 |
| 5,128,865 A | 7/1992 | Sadler ........................ 704/2 |
| 5,159,552 A | 10/1992 | van Gasteren et al. ......... 704/1 |
| 5,267,155 A | 11/1993 | Buchanan et al. ............ 715/540 |
| 5,317,546 A | 5/1994 | Balch et al. ................... 368/9 |
| 5,337,233 A | 8/1994 | Hofert et al. ................ 715/540 |
| 5,341,293 A | 8/1994 | Vertelney et al. ............ 715/530 |
| 5,351,190 A | 9/1994 | Kondo ........................ 704/8 |
| 5,392,386 A | 2/1995 | Chalas ....................... 715/841 |
| 5,446,891 A | 8/1995 | Kaplan et al. ............... 395/600 |
| 5,541,836 A | 7/1996 | Church et al. ................ 704/7 |
| 5,596,700 A | 1/1997 | Darnell et al. ............... 715/512 |
| 5,617,565 A | 4/1997 | Augenbraun et al. ........ 395/604 |
| 5,625,783 A | 4/1997 | Ezekiel et al. .............. 395/352 |
| 5,627,958 A | 5/1997 | Potts et al. .................. 715/708 |
| 5,634,019 A | 5/1997 | Koppolu et al. ............. 715/744 |

(Continued)

FOREIGN PATENT DOCUMENTS

EP    0481784 A2    4/1992

(Continued)

OTHER PUBLICATIONS

Fordin, "Java Architecture for XML Binding: Executive Summary", Sun Microsystems, published Jul. 2003, p. 1-7.*

(Continued)

*Primary Examiner*—Doug Hutton
*Assistant Examiner*—Amelia Rutledge
(74) *Attorney, Agent, or Firm*—Merchant & Gould; Ryan T. Grace

(57) ABSTRACT

A programmable object model allows a user to programmatically access and utilize a Namespace or schema library containing XML schema files and related XML-based resources for associating the schema files and XML-based resources with one or more documents and for customizing the functionality associated with the schema files and XML-based resources. The programmable object model also allows the user/programmer to remove schema files and other XML-based resources from association with previously associated documents.

15 Claims, 4 Drawing Sheets

U.S. PATENT DOCUMENTS

| | | | |
|---|---|---|---|
| 5,640,560 A | 6/1997 | Smith | 395/615 |
| 5,657,259 A | 8/1997 | Davis et al. | 708/204 |
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,781,189 A | 7/1998 | Holleran et al. | 715/826 |
| 5,781,904 A | 7/1998 | Oren et al. | 707/100 |
| 5,787,413 A * | 7/1998 | Kauffman et al. | 707/2 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,995,756 A | 11/1999 | Hermann | 395/712 |
| 6,006,265 A | 12/1999 | Rangan et al. | 709/245 |
| 6,006,279 A | 12/1999 | Hayes | 719/328 |
| 6,014,616 A | 1/2000 | Kim | 704/8 |
| 6,028,605 A | 2/2000 | Conrad et al. | 345/840 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 715/505 |
| 6,092,074 A | 7/2000 | Rodkin et al. | 707/102 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,603 B1 | 2/2003 | Bays et al. | 707/102 |
| 6,546,433 B1 | 4/2003 | Matheson | 709/318 |
| 6,556,984 B1 | 4/2003 | Zien | 707/2 |
| 6,571,241 B1 | 5/2003 | Nosohara | 707/6 |
| 6,618,733 B1 | 9/2003 | White et al. | 707/103 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,633 B2 | 11/2003 | Chau et al. | 707/1 |
| 6,658,623 B1 | 12/2003 | Schilit et al. | 715/513 |
| 6,687,485 B2 | 2/2004 | Hopkins et al. | 434/350 |
| 6,697,824 B1 | 2/2004 | Bowman-Amuah | 709/229 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,745,208 B2 | 6/2004 | Berg et al. | 707/201 |
| 6,779,154 B1 | 8/2004 | Nussbaum et al. | 715/234 |
| 6,795,808 B1 | 9/2004 | Strubbe et al. | 704/275 |
| 6,826,726 B2 | 11/2004 | Hsing et al. | 715/513 |
| 6,868,525 B1 | 3/2005 | Szabo | 715/738 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,915,303 B2 * | 7/2005 | Kauffman | 707/102 |
| 6,925,457 B2 | 8/2005 | Britton et al. | 707/1 |
| 6,925,470 B1 | 8/2005 | Sangudi et al. | 707/102 |
| 6,948,133 B2 | 9/2005 | Haley | 715/780 |
| 7,047,488 B2 * | 5/2006 | Ingersoll et al. | 715/523 |
| 7,143,343 B2 | 11/2006 | Bender et al. | 715/241 |
| 2001/0029605 A1 | 10/2001 | Forbes et al. | 717/11 |
| 2001/0041328 A1 | 11/2001 | Fisher | 434/157 |
| 2001/0056461 A1 | 12/2001 | Kampe et al. | 709/201 |
| 2002/0004803 A1 | 1/2002 | Serebrennikov | 715/513 |
| 2002/0007309 A1 | 1/2002 | Reynar | 705/14 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |

| | | | |
|---|---|---|---|
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0025728 A1 | 2/2003 | Ebbo et al. | 345/744 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0084138 A1 | 5/2003 | Tavis et al. | 709/223 |
| 2003/0097318 A1 | 5/2003 | Yu et al. | 705/35 |
| 2003/0101204 A1 | 5/2003 | Watson | 708/760 |
| 2003/0101416 A1 | 5/2003 | McInnes et al. | 715/513 |
| 2003/0106040 A1 | 6/2003 | Rubin et al. | 717/106 |
| 2003/0121033 A1 | 6/2003 | Peev et al. | 717/175 |
| 2003/0126136 A1 | 7/2003 | Omoigui | 707/10 |
| 2003/0135825 A1* | 7/2003 | Gertner et al. | 715/513 |
| 2003/0140308 A1 | 7/2003 | Murthy et al. | 715/500 |
| 2003/0145197 A1 | 7/2003 | Lee et al. | 713/155 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0172343 A1 | 9/2003 | Leymaster et al. | 715/500 |
| 2003/0192040 A1 | 10/2003 | Vaughan | 717/173 |
| 2003/0208498 A1 | 11/2003 | Feinberg et al. | 707/100 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0003389 A1 | 1/2004 | Reynar et al. | 717/178 |
| 2004/0006741 A1 | 1/2004 | Radja et al. | 715/513 |
| 2004/0103369 A1 | 5/2004 | Robertson et al. | 715/234 |
| 2004/0165007 A1 | 8/2004 | Shafron | 345/781 |
| 2004/0199861 A1 | 10/2004 | Lucovsky | 715/500 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0120313 A1 | 6/2005 | Rudd et al. | 715/866 |
| 2005/0187926 A1 | 8/2005 | Britton et al. | 707/3 |

FOREIGN PATENT DOCUMENTS

| | | |
|---|---|---|
| EP | 0598511 A2 | 5/1994 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| WO | WO 95/07510 A1 | 3/1995 |
| WO | WO 99/17240 A1 | 4/1999 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A1 | 2/2002 |

OTHER PUBLICATIONS

Microsoft Computer Dictionary, 5th Ed., copyright 2002, Microsoft Press, p. 33 and 372.*

Skonnard, "What's New in MSXML 4.0", p. 1-12, published Dec. 2001 in MSDN Magazine, available at: http://msdn.microsoft.com/msdnmag/issues/01/12/xml.*

Sosnoski, "XML and Java technologies: Document models, Part 1: Performance", p. 1-13, published Sep. 1, 2001, IBM DeveloperWorks, available at http://www-128.ibm.com/developerworks/xml/library/x-injava/.*

Armstrong, et al., "The Java Web Services Tutorial", published Feb. 4, 2002 by Sun Microsystems, Inc., p. 1-84 and 329-366.*

Kuramitsu, et al., "Distributed object-oriented schema for XML-based Electronic Catalog Sharing Semantics among Businesses", Web Information Systems Engineering, 2000, published Jun. 2000, IEEE, p. 87-96.*

Schloss, et al., IBM Working Draft Feb. 15, 2002, "XML Schema Infoset API Requirements", p. 1-14.*

Obasanjo, XML.com article, "W3C XML Schema Design Patterns: Dealing With Change", published Jul. 3, 2002, p. 1-12.*

McQueen, Altova Mailing List Archives, "Re: using namespaces to version", dated May 4, 2001, p. 1-2.*

"Altova markup your mind!" http://web.archive.org/web/20021204211721/http://altova.com/products_ide.html, Dec. 2002, pp. 1-3.

Apple Data Detectors User's Manual, Apple Computer, Inc., 1997, pp. 1-15.

Arbortext, "Arbortext and Accessibilty", http://web.archive.org/web/20021219133536/www.arbortext.com/html/accessibility.html, Dec. 2002, pp. 1-5.

Arbortext, "Arbortext's Support for XSL-FO", http://web.archive.org/web/20021221021632/www.arbortext.com/html/xsl-fo.html. Dec. 2002, pp. 1-4.

Arbortext, "Schemas", http://web.archive.org/web/20021221023148/www.arbortext.com/html/schemas.html, Dec. 2002, pp. 1-3.

Arbortext, "XML Compliance, 100% Pure XML", http:web.archive.org/web/20021209185855/www.arbortext.com/html/xml_compliance, Dec. 2002, pp. 1-3.

Barrett, Rob, Paul P. Maglio and Daniel C. Kellem; How to personalize the Web; Conference proceedings on human factors in computing systems (1997) p. 75-82.

"Being 'Smart' with Smart Tags in Office XP", Create for Mississippi, Aug. 2001, http://www.create.cett.msstate.edu/create/howto/smart_tags.pdf, 7 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

Bonifati A., "Active Behaviors within XML Document Management", EDBT Ph. D. Workshop, Mar. 2000, pp. 1-4.

Boone, "Concept Features in Re: Agent Intelligent Email Agent", Proceedings of the 2nd International Conference on Autonomous Agents, May 9-13, 1998, pp. 141-148.

Bosak, "XML: The Universal Publishing Format", SGML/XML Europe '98, May 1998, pp. A1-C17.

Braganholo V., "Updating Relational Databases Through XML Views", Technical Report, Sep. 2002, pp. 1-61.

Brockschmidt, K., "Inside OLE, Second Edition", 1995, Microsoft Press, p. 169.

Brooks-Bilson,"Programming ColdFusion" [electronic resource] 2001, Safari Tech Books Online, 1st Edition, 25 pp.

Ceri S. et al., "Deriving Production Rules for Incremental View Maintenance", Proceedings of the 17th International Conference on Very Large Data Bases, Sep. 1991, pp. 577-589.

Claris Em@iler Getting Started User's Guide, For Macintosh, Claris Corporation, 1995-1997, 61 pp.

Clark, James, and DeRose, Steve, "XML Path Language (XPath), Version 1.0", W3C, http://web.archive.org/web/20210100034434/http://www.w3.org/TR/xpath, 1999-2000, pp. 1-31.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "Corel XMetal4, Making XML Content Creation Easy", http://web.archive.org/web/20031118215158/www.corel.com/servlet/Satellite?pagename, Nov. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Desmarais, Michel C. and Jiming Liu; *Exploring the applications user-expertise assessment for intelligent interfaces*; Proceedings of the conference on human factors in computing systems, (1993) p. 308-313.

Devanbue, P. et al., "Chime: customizable hyperlink insertion and maintenance engine for software engineering environments", Software Engineering, Publication date: 1999, ISBN: 1-58113-07400.

Developer's Guide To Apple Data Detectors, For Version 1.0.2., Apple Computer, Inc., 1997, pp. 1-33.

Driza, Scott, "Learn Word 2000 VBA Document Automation", Wordware Publishing Inc., 2001, 6 pp.

Falquet G. et al., "Design and Analysis of Active Hypertext Views on Databases", Information Sciences Institute, Jan. 2002, pp. 1-24.

Fan et al., "FormPlus: A Form Authoring Toolkit", Proceedings of the Fourteenth Annual Computer Software and Applications Conference, Oct. 31, 1990-Nov. 2, 1990, pp. 225-260.

"Featuring Adobe® FrameMaker 6.0", Adobe Systems Incorporated, San Jose, CA, Apr. 2000, 4 pp.

Fernandez M. et al., "SilkRoute: trading between relations and XML", Computer Networks, vol. 33, No. 1-6, Jun. 2000, pp. 723-745.

Flanagan, D., "JavaScript—The Definitive Guide, Fourth Edition", Jan. 2002, O'Reilly, 12 pp.

Foley, James D.; *Future directions in user-computer interface software*; Conference proceedings on organizational computer systems, (1991) p. 289-297.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

*Getting Results With Microsoft® Office 97, Real World Solutions For The Work You Do*, Microsoft Corporation, 1995-1997, pp. 1-703.

Glushko, Robert J., Jay M. Tenenbaum and Bart Meltzer; *An XML framework for agent-based E-commerce*; Commun. ACM 42, 3 (Mar. 1999) p. 106.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

Harold, E.R., "XML: Extensible Markup Language", IDG Books Worldwide, Books 24x7.com printout, 1998, 20 pp.

Hartson, H. Rex and Deborah Hix; *Human-computer interface development: concepts and systems for its management*; ACM Comput. Surv. 1 (Mar. 1989) p. 5-92.

Hewkin, "Smart Tags-the Distributed-Memory Resolution", IEE Review, Jun. 22, 1989, pp. 203-206.

Homer, Alex et al., Professional Active Services Pages, 1997, Wrox Press Ltd., Section"Client-Side Scripting and Components", subsection "Choosing Your Applets, and Controls", 16 pp.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

IBM Corporation, IBM Research Disclosure #368; "Multimedia Hyperlinks Automatically Created For Reference Documents," *IBM Technical Disclosure Bulletin*, Jun. 1993, pp. 1-5.

IBM Technical Disclosure Bulletin, "National Language Support Enhancement for Culture-Specific Operations", Nov. 1, 1993, vol. 36, Issue 11, pp. 629-638.

*InfoCentral*™ 7, User's Manual, Corel Corporation, vol. 1, Version 7.0, 1996, pp. 1-86.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Integrated Development Environment (IDE)", http://web.archive.org/web/20020602032242/http:altova.com/products_ide.html, Jun. 2002, pp. 1-2.

"Integrating with External Systems: iPlanet™ Unified Development Server", Sun Microsystems, Inc., Ver. 5.0, Aug. 2001, pp. 127-156.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Kristensen, "Template Resolution in XML/HTML", Computer Networks and ISDN Systems, vol. 30, 1998, pp. 239-249.

Kukich, Karen; *Technique for Automatically Correcting Words in Text*; ACM Comput. Surv., 24, 4 (Dec. 1992); pp. 377-439.

Marais, Hannes, "Supporting Cooperative and Personal Surfing With a Desktop Assistant", 1997, ACM Press, pp. 129-138.

Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.

Marx, Matt and Chris Schmandt; *Putting People First: Specifying Proper Names in Speech Interfaces*; Proceedings of the ACM Symposium on User Interface Software and Technology; 1994; pp. 29-37.

Marx, Matthew and Chris Schmandt; *CLUES: dynamic personalized message filtering*; Proceedings of the ACM 1996 conference on computer supported cooperative work (1996) p. 113-121.

McMahon, Lee. E., "SED—A Non-Interactive Text Editor," Bell Laboratories, Murray Hill, New Jersey 07974, Aug. 15, 1978, pp. 16.

Measuring Units Conversion Table—http://web.archie.org- 1997 Internet French Property, pp. 1-4.

Menu Customizing, IBM Technical Disclosure Bulletin, vol. 34, No. 1, Jun. 1991, pp. 91-92 (4 pp. total).

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Microsoft Unveils Visual Studio.NET Enterprise Tools", Microsoft Corporation, http://microsoft.com/presspass/press/2001/may01/05-21vseepr.mspx, May 2001, pp. 1-4.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Panagiotis, Christias, Man-cgi 1.15, http://www.calpoly.edu/cgi-bin/man-cgi?spell+1, 1994, 3 pp.

Panagiotis, Christias, Man-cgi 1.15, http://www.physics.umn.edu/cgi-bin/man-cgi?spell, 1994, 5 pp.

Pentland, Alex; *Perceptual user interfaces: perceptual intelligence*; Commun. ACM 43, 3 (Mar. 2000) p. 35-44.

Perry, Brad, et al., "Discovering Similar Resources by Content Park-Linking", Proceedings of the Sixth International Conference on Information and Knowledge Management, published by ACM Press 1997, pp. 317-324.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

Quin, Liam, "Extensible Markup Language (XML)", W3C Architecture Domain, http://web.archive.org/web/2002121962057/http://www.w3.org/XML/, 1996-2002, pp. 1-3.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

"Smart Tags: Dumb Technology?", webreference.com, Online, Aug. 29, 2001, http://www.webreference.com/xml/column30/3.html, 3 pp.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Sriram, V., "ComponentXchange: An E-Exchange for Software Components", Master Thesis, CitSeer, May 2001, pp. i-v, 1-77.

Stairmand, Mark A.; *Textual context analysis for information retrieval*; Proceedings of the 20th annual international ACM SIGIR conference on research and development in information retrieval (1997) p. 140-147.

Takkinen et al., "CAFÉ: A Conceptual Model for Managing Information in Electronic Mail", Proceedings of the Annual Hawaii International Conference on System Sciences, 1998, pp. 44-53.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

*The Complete Linux™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

"The StarOffice™ 6.0 Suite: New Features Guide", Sun Microsystems, V. 1.1, Jul. 2002, pp. 1-31.

Toth, V., "Visual C++ 4 Unleashed", 1996, Sams Publishing, p. 174.

Towers, J. Tarin, Visual Quickstart Guide: Dreamweaver 2 for Windows and Macintosh, 1999, Peachpit Press, pp. 150-151.

Tsai, M., P. Reiher and G.J. Popek; *Command management system for next-generation user input*; Proceedings of the seventh workshop on hottopics in operating systems, (1999) p. 179-84.

*User Manual For AddressMate and AddressMate Plus*, CoStar Corporation, AddressMate Software, 1994-1995, pp. 1-210.

"Using Flyswat", http://www.flywsat.com/using.html, download date: Sep. 28, 1999, 1 pp.

"What is Flyswat", http://www.flyswat.com, download date: Sep. 28, 1999, 5 pp.

Wilker, John, "ColdFusion MX Adds J2EE, XML, and Web Services Compatibility", Aug. 9, 2002, http://builder.com.com/5102-6387-104585.html, 3 pp.

Willisson, Pace, Ispell (1), "User Commands", http://www.csee.usf.edu/cgi-bin/man-cgi?ispell, 1983, 18 pp.

Willisson, Pace, Ispell (1), http://www.rt.com/man/findaffix.1.html, 1983, 15 pp.

\* cited by examiner

PROGRAMMABLE OBJECT MODEL FOR NAMESPACE OR SCHEMA LIBRARY SUPPORT IN A SOFTWARE APPLICATION

RELATED APPLICATIONS

United States Utility Patent Application by applicant matter number 60001.0263US01/MS303917.1, entitled "Programmable Object Model for Extensible Markup Language Schema Validation," and United States Utility Patent Application by applicant matter number 60001.0264US01/MS303918.1, entitled "Programmable Object Model for Extensible Markup Language Markup in an Application," are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates programmable object models. More particularly, the present invention relates to a programmable object model for Namespace or schema library support in a software application.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well known strengths including rich editing, formatting, printing, calculation and on-line and off-line editing.

Most computer software applications do not contain all necessary programming for providing functionality required or desired by every potential user. Many programmers often wish to take advantage of an existing application's capabilities in their own programs or to customize the functionality of an application and make it more suitable for a specific set of users or actions. For example, a programmer working in the financial industry may wish to customize a word processor for a user audience consisting of financial analysts editing financial reports. In recent years, the Extensible Markup Language has been used widely as an interchangeable data format for many users. Often users of XML functionality attach or associate one or more XML schema files or XML-based solutions to a document being edited or created by the user. However, users/programmers are limited in their ability to apply XML schema files and other XML-based solutions functionality to a given document because the user/programmer does not have direct and easy access to the Namespace or schema library containing the XML schema files or other XML-based solutions.

Accordingly, there is a need in the art for a programmable object model for allowing a user/programmer to access a Namespace or schema library of XML resources for customizing or otherwise manipulating the resources to enhance the user/programmer's use of XML functionality with a software application document. It is with respect to these and other considerations that the present invention has been made.

SUMMARY OF THE INVENTION

The present invention provides methods and systems for allowing a user to programmatically access and utilize a Namespace or schema library containing XML schema files and related XML-based resources for associating those XML-based resources with one or more documents and for customizing the functionality associated with those XML-based resources. Once a user or programmer obtains access to the Namespace or schema library, the user may programmatically associate XML schema files with XML data in an associated document, and conversely, the user may detect and remove associations of XML schema files with XML data contained in the document. The user may also programmatically associate transformation files with XML data contained in a document and detect and remove existing transformation files associated with XML data contained in the document. The user may also associate other files and executable software associated with XML-based and other document solutions with XML data contained in the document. Additionally, the user may detect and delete the association of XML-based solutions and other types of executable software from association with XML data contained in a document.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Embodiments of the present invention are directed to methods and systems for allowing a user to programmatically call a Namespace/Schema library of XML schema files and XML-based solutions and resources for controlling the association of those files, solutions and resources to one or more documents. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
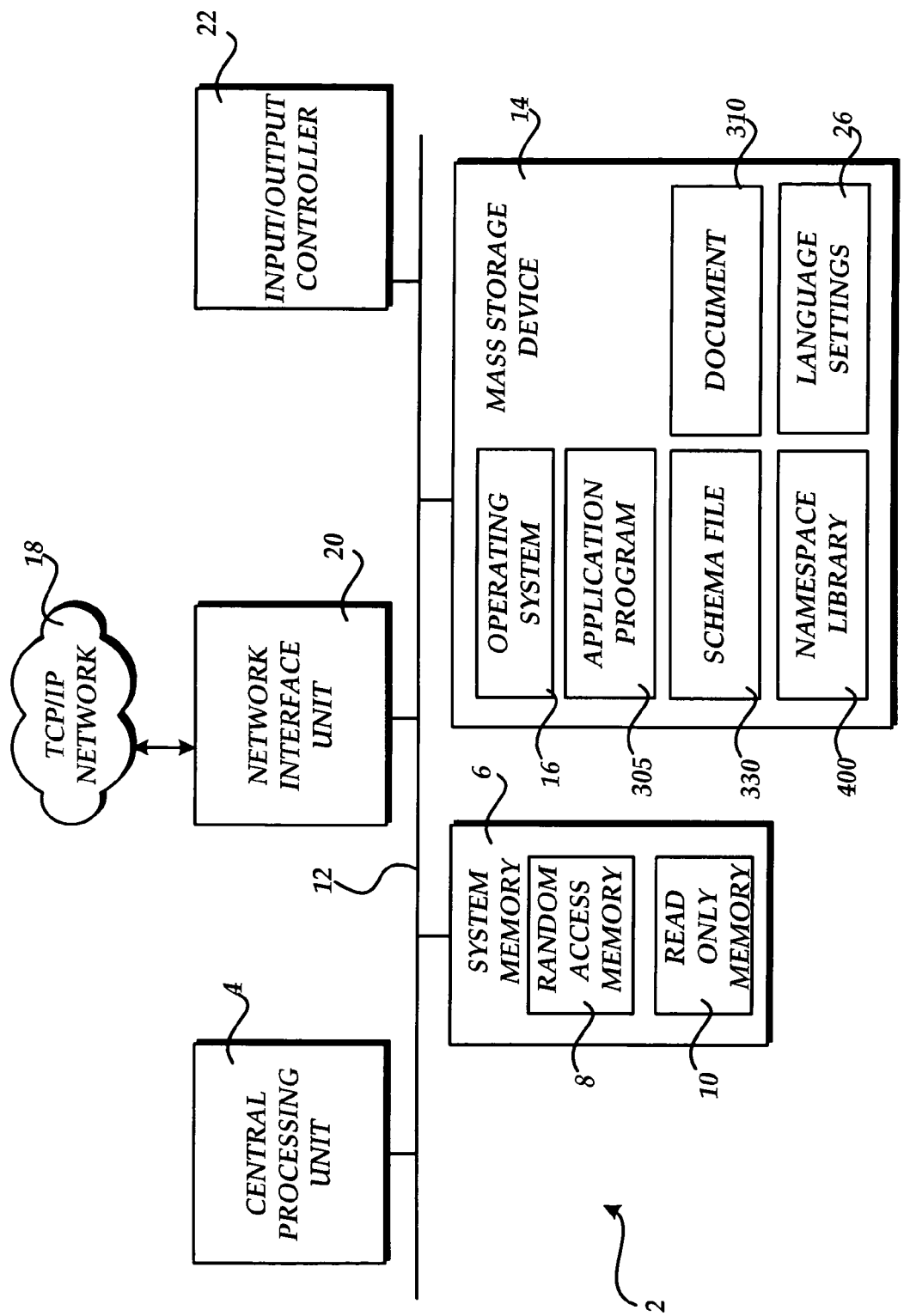
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFF CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. A schema file 330 and a namespace/schema library 400, described below, are also shown.

Figure 2:
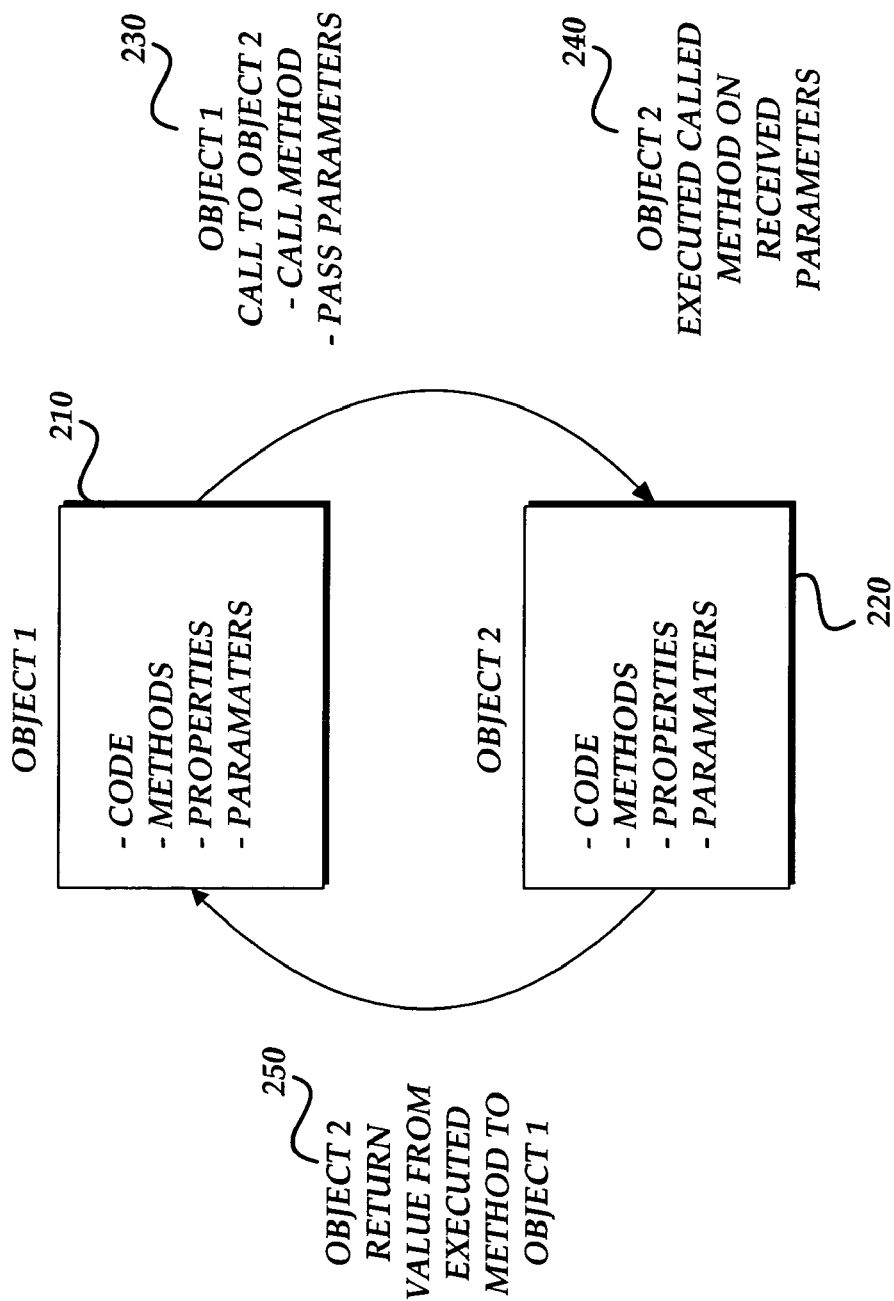
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters. Similarly, a second object 220 may also include software code, executable methods, properties, and parameters.

A first object 210 may communicate with a second object 220 to obtain information or functionality from the second object 220 by calling the second object 220 via a message call 230. As is well know to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
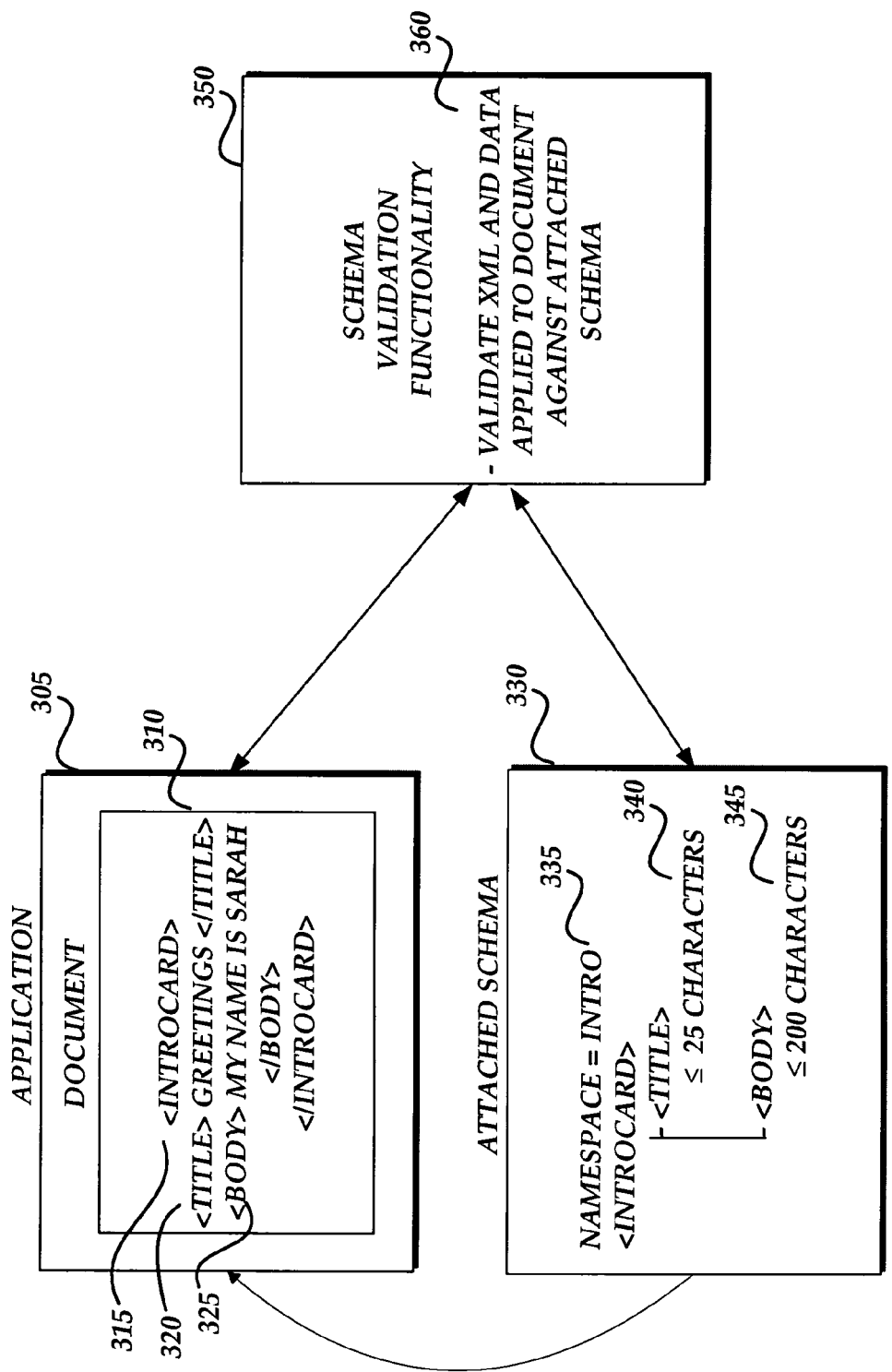
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by the Namespace "intro" the schema file includes a root element of <introCard>.

According to the schema file 330, the <introCard> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see US Patent Application entitled Mechanism for Downloading Software Components from a Remote Source for Use by a Local Software Application, U.S. Ser. No. 10/164,260, filed Jun. 5, 2002.

Referring still to FIG. 3, a schema validation functionality module 350 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <introCard>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

Programmable Object Model for Namespaces/Schema Libraries

As described above with reference to FIG. 3, in order to provide a definitional and rules-oriented framework for applying Extensible Markup Language (XML) markup to a document 310, one or more schema files 330 may be associated or attached to the document for setting definitions and rules governing the application of XML markup elements corresponding to a given schema file 330 to a document 310. As described, a plurality of XML schema files and other document solutions, for example pre-structured templates, may be attached to or associated with a single XML document 310. Moreover, as described above, a number of different XML schema files identified by a Namespace identification and a number of document solutions may be stored in a Namespace or schema library apart from the document 310. According to embodiments of the present invention, users are allowed to programmatically call the Namespace or schema library associated with one or more documents 310 for customizing or otherwise manipulating schema file Namespaces and associated definitions, rules, resources, and solutions associated with various Namespace identifiers contained in the Namespace or schema library.

Figure 4:
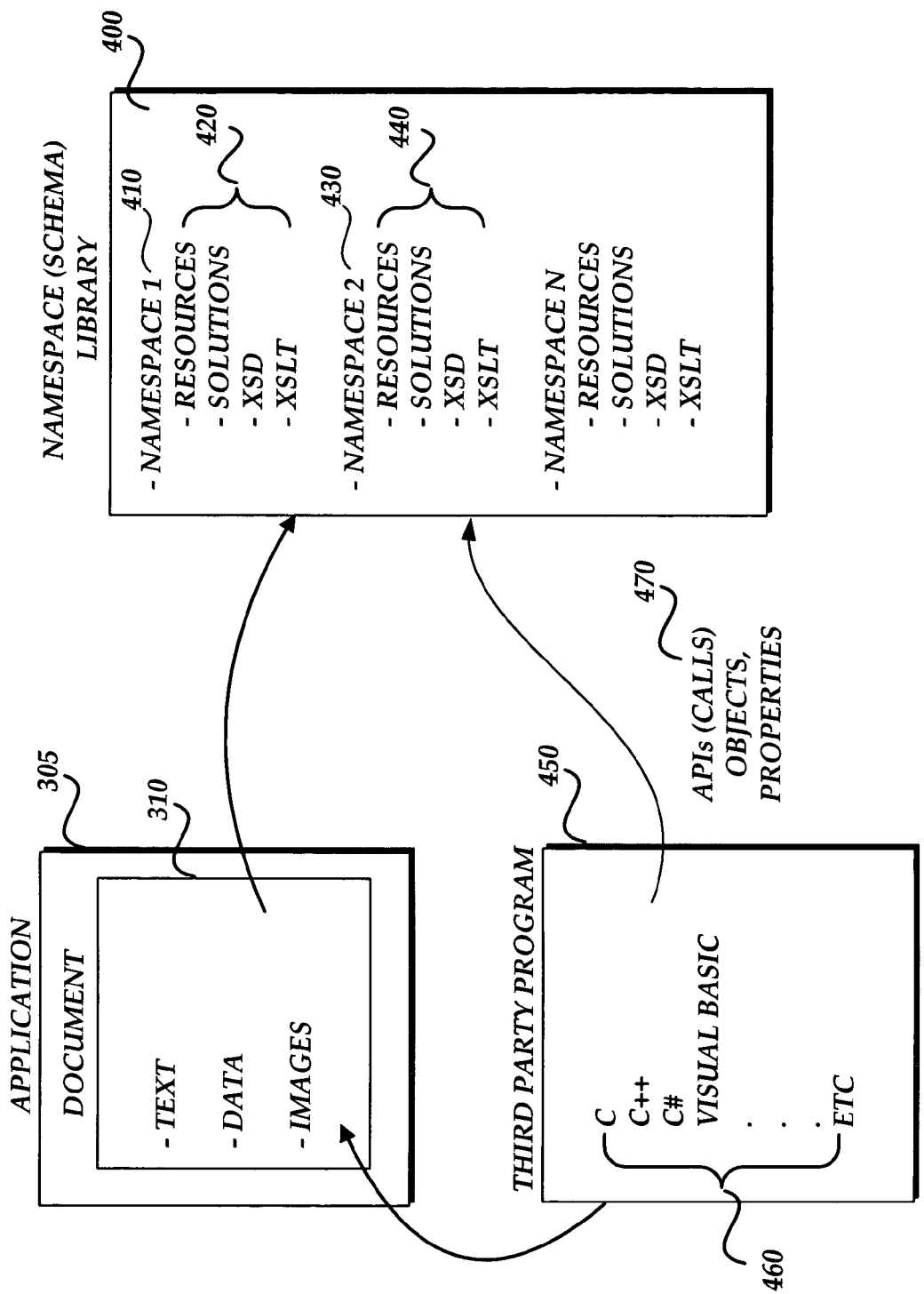
FIG. 4 is a block diagram illustrating interaction between a document, a Namespace or schema library and a third party software application.

FIG. 4 is a block diagram illustrating interaction between a document 310, a Namespace or schema library 400 and a third party application 450. According to embodiments of the present invention, users may programmatically call the Namespace library 400 via a set of object-oriented message calls or application programming interfaces 470 for modifying the contents or operation of individual schema files 410, 430 or resources 420, 440 associated with schema files identified in the Namespace library 400. The user may communicate with the Namespace library from the application 305 or from a third party program 450 via a set of object-oriented message calls, and the third party program may be developed using a variety of programming languages, such as C, C++, C#, Visual Basic, and the like.

By having access to the Namespace library through a set of application programming interfaces 470, the user may programmatically associate one or more additional XML schema files or Namespaces with XML data, and conversely, the user may detect and remove existing associations between one or more XML schema files and XML data or markup applied to the document 310. The user may also programmatically associate Extensible Stylesheet Language Transformation (XSLT) with XML data applied to a document, and conversely, the user may detect and remove existing XSLT transforms from association with XML data applied to the document 310. Moreover, the user may programmatically associate other files and executable software applications with XML data applied to the document 310 and detect and remove existing associations of other software applications and files with XML data.

For example, the Namespace 430 illustrated in the Namespace library 400 may contain a solution comprised of a pre-formatted structure for a resume document template. When that solution is applied to the document 310, associated schema definitions and rules designed by the creator of the resume template document will be applied to XML markup and associated text entered into the document 310. If a schema file associated with a resume document template requires that an experience section of a resume document must have at least three past or present job descriptions, that schema definition will be applied to the document 310 such that at least three job descriptions must be entered by a subsequent user in the experience section in order for the XML document 310 to be validated by a schema validation module 350. Continuing with this example, if such a resume document template schema file is associated with the document 310, and a user desires to remove the association of that schema file with the document 310, the user may do so programmatically from a third party program by sending an object-oriented message call to the Namespace library 450 or to the application 305 with a provided application programming interface for directing the removal of the association of the resume document template schema file from the document 310.

The following is a description of objects and associated properties comprising object-oriented message calls or application programming interfaces that allow a user to programmatically access the Namespace library 400 as described above. Following each of the objects and associated properties set out below is a description of the operation and functionality of the object or associated property.

Application Object
  The following are methods and properties of the object.
  .XMLNamespaces property
    A read only pointer to an XMLNamespaces collection which represents the Namespace library available to the application.
  XMLNamespaces collection object—an object providing access to the XMLNamespace objects. It represents the Namespace library. Each XMLNamespace object in the collection represents a single and unique Namespace in the Namespace library. The following are methods and properties of the object.
    .Add( ) method
      A method creating and adding to the collection a new XMLNamespace object. It is used to register a new Namespace in the Namespace library. It returns a new XMLNamespace object. It can accept the following parameters.
      Path—pointer to the schema file for the Namespace. The pointer can be a file path represented as a string.
      NamespaceURI—the URI of the Namespace that represents the schema. The URI can be a text string.
      Alias—a text string representing an alternate (more user-friendly) name for the Namespace that the programmer may specify.
      InstallForAllUsers—a flag indicating whether the new Namespace in the Namespace library should be available to all users of the computer or only the current user.
    .Application property
      A read only pointer to the application object representing the application of this object model.
    .Count property
      A read only property returning the number of registered Namespaces in the Namespace library. The property is the same as the total number of XMLNamespace objects in the XMLNamespaces collection.
    .Creator property
      A read only pointer to the creator of the object.
    .InstallManifest( ) method
      A method for installing solution manifests that register Namespaces in the Namespace library. It can accept the following parameters.
      Path—pointer to the manifest file for the manifest. The pointer can be a file path represented by a text string.
      InstallForAllUsers—a flag indicating whether the new Namespaces installed in the Namespace library by the manifest should be available to all users of the computer or only the current user.
    .Item( ) method
      A method for accessing the individual members of this collection using an numerical index or a search keyword. The method can accept the following parameters.
      Index—a number representing the position of the requested XML Namespace object in the Namespace library. The index can also be a text string representing the alias or the URI of the requested Namespace.
    .Parent property
      A read only property returning the parent object of the collection. This property returns a pointer to the application from which the XMLNamespaces collection is accessed.
  XMLNamespace object—an object representing an individual Namespace entry in the Namespace library (and an individual item in the XMLNamespaces collection). The following are methods and properties of the object.
    .Alias property
      A property for controlling the alias the programmer associates with the Namespace. It can support the following parameter.
      AllUsers—a flag indicating whether the alias is available to all users or just the current user.
    .Application property
      A read only pointer to the Application object representing the application of this object model.
    .AttachToDocument( ) method
      A method for attaching the schema of the Namespace represented by the object to the selected document. It supports the following parameters:
      Document—a pointer to the document to which the schema is requested to be attached.
    .Creator property
      A read only pointer to the creator of the object.
    .DefaultTransform property
      A property that points to the default XSLT transformation associated with this Namespace. It can support the following parameter.
      AllUsers—a flag indicating whether the default transformation setting should affect all users of the machine or only the current user.
    .Delete( ) method
      A method for removing the XMLNamespace object from the collection and destroying it, effectively removing the Namespace association represented by this object from the Namespace library.
    .Location property
      A read only property that controls the location of the schema associated with the Namespace represented by the XMLNamespace object. It can support the following parameter.

AllUsers—a flag indicating whether the schema location setting should affect all users of the machine or only the current user.

.Parent property

A read only property returning the parent object of the XMLNamespace object. This property returns a pointer to the XMLNamespaces collection of which the object is a member.

.URI property

A read only property returning the URI of the Namespace represented by the object.

.XSLTransforms property

A read only pointer to the XSLTransforms collection representing XSLT transformations associated with the Namespace represented by the object.

XSLTransforms object—an object providing access to the XSLTransforms objects each of which represents a single and unique XSLT transform associated with a Namespace in the Namespace library. The following are methods and properties of the object.

.Add( ) method

A method for creating and adding to the collection a new XSLTransform object. It is used to associate a new XSLT transformation with a Namespace in the Namespace library. It returns a new XSLTransform object. It can accept the following parameters.

Location—pointer to the XSLT file; can be a file path represented as a text string.

Alias—a text string representing an alternate (more user-friendly) name for the XSLT transformation that the programmer may specify.

InstallForAllUsers—a flag indicating whether the new Namespace in the Namespace library should be available to all users of the computer or only the current user.

.Application property

A read only pointer to the Application object representing the application of this object model.

.Count property

A read only property returning the number of registered XSLT transforms for a given Namespace in the Namespace library. It is the same as the total number of XSLTransform objects in the XSLTransforms collection.

.Creator property

A read only pointer to the creator of the object.

.Item( ) method

A method for accessing the individual members of this collection using an numerical index or a search keyword. It can accept the following parameters.

Index—a number representing the position of the requested XSLTransform object in the Namespace library. The index can also be a text string representing the alias of the requested XSL transform.

.Parent property

A read only property returning the parent object of the collection. This property returns a pointer to the application from which the XSLTransforms collection is accessed.

XSLTransform object—an object representing an XSLT transformation associated with a Namespace in the Namespace library. The following are methods and properties of the object.

.Alias property

A property for controlling the alias the programmer associated with the XSLT transform in the Namespace library. It can support the following parameter.

AllUsers—a flag indicating whether the alias is available to all users or just the current user.

.Application property

A read only pointer to the Application object representing the application of this object model.

.Creator property

A read only pointer to the creator of the object.

.Delete( ) method

A method for removing the XSLTransform object from the collection and destroying it, effectively removing the association between the XSLT transform and its Namespace in the Namespace library.

.Location property

A read only property that controls the location of the XSLT transform associated with the given Namespace and represented by the XSLTransform object. It can support the following parameter.

AllUsers—a flag indicating whether the XSLT transform location setting should affect all users of the machine or only the current user.

.Parent property

A read only property returning the parent object of the XSLTransform object. This property returns a pointer to the XSLTransforms collection of which the object is a member.

As described herein, methods and system are provided for allowing a user to programmatically call the resources identified in an Extensible Markup Language Namespace or schema library for customizing or otherwise modifying the association of resources identified or contained in the Namespace or schema library with one or more associated documents. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for modifying the resources of a Markup Language (ML) schema library, comprising:

calling, from a document editor, the ML schema library via an object-oriented message call, wherein the object-oriented message call is configured to access and to modify the content of a ML schema file of the ML schema library that is applied to a document;

executing a method of the object-oriented message call, wherein the method is executed for:

creating a new ML Namespace, adding the new ML Namespace to a collection of ML Namespaces, where a path to a schema file associated with the new ML Namespace and a uniform resource identifier for the new ML Namespace are passed to the ML schema library as parameters of the method, installing solution manifests for registering ML Namespaces in the ML schema library, and attaching the schema file of the ML Namespace to a document, whereby a pointer to the document is passed to the ML schema library as a parameter of the method;

in response to the execution of the method on the ML schema library, causing a modification to content of at least one namespace of the schema file; and applying the modification of the ML schema file to the document to govern the application of ML elements on the document.

2. The method of claim 1, wherein executing the method includes executing a method for accessing individual ML resources from a collection of ML resources using a numerical index, wherein a numerical index associated with an individual ML resource is passed as a parameter with the method.

3. The method of claim 1, wherein executing the method includes executing a method for controlling an alias name associated with a specified Namespace identified in the ML schema library.

4. The method of claim 1, further comprising passing an object property that points to a default XSLT transformation associated with a specified Namespace.

5. The method of claim 1, wherein executing the method includes executing a method for removing an ML Namespace object from a collection of Namespace objects.

6. The method of claim 1, wherein executing the method includes executing a method for creating a new XSLT transformation and for adding the new XSLT transformation to a collection of XSLT transformations, where a pointer to the new XSLT transformation is passed to the ML schema library as a parameter to the method.

7. The method of claim 1, wherein executing the method includes executing a method for accessing individual XSLT transformations contained in a collection of XSLT transformations using a numerical index, wherein a numerical index representing the position of a requested XSLT transformation in the ML schema library is passed as a parameter to the ML schema library with the method.

8. The method of claim 1, wherein executing the method includes executing a method for controlling an alias name associated with an XSLT transformation identified in the ML schema library.

9. The method of claim 1, wherein executing the method includes executing a method for removing an XSLT transformation from a collection of XSLT transformations.

10. A computer-readable storage medium having computer executable instructions for modifying resources of a Markup Language (ML) schema library, the instructions comprising:

receiving an object-oriented message call on the ML schema library, wherein the object-oriented message call is configured to access and to modify the content of a ML schema file of the ML schema library;

executing a method of the object-oriented message call, wherein the method is executed for:

adding a new ML Namespace to a collection of ML Namespaces, where a path to a schema file associated with the new ML Namespace and a uniform resource identifier for the new ML Namespace are passed to the ML schema library as parameters of the method, installing solution manifests for registering ML Namespaces in the ML schema library, and attaching the schema file of the ML Namespace to a document, whereby a pointer to the document is passed to the ML schema library as a parameter of the method;

in response to the execution of the method on the ML schema library, causing a modification to the content of at least one namespace of the schema file; and associating the modification of the ML schema file with a document to govern the application of ML elements on the document.

11. The computer-readable storage medium of claim 10, wherein the execution of the method on the ML schema library causes the removal of a namespace from the schema file.

12. The computer-readable storage medium of claim 10, wherein the execution of the method on the ML schema library causes at least one member of a group comprising: associating an XSLT transformation with the schema file, and removing an association of an XSLT transformation with the schema file.

13. The computer-readable storage medium of claim 10, wherein the execution of the method on the ML schema library causes at least one member of a group comprising: associating an ML based resource with the schema file, and removing an association of an ML based resource with the schema file.

14. A computer system for modifying resources of a Markup Language (ML) schema library, the instructions comprising:

a processor;

a memory having computer-executable instructions stored thereon, wherein the computer-executable instructions are configured to:

receive an object-oriented message call on the ML schema library, wherein the object-oriented message call is configured to access and to modify the content of a ML schema file of the ML schema library;

execute a method of the object-oriented message call, wherein the method is executed for:

adding a new ML Namespace to a collection of ML Namespaces, where a path to a schema file associated with the new ML Namespace and a uniform resource identifier for the new ML Namespace are passed to the ML schema library as parameters of the method, installing solution manifests for registering ML Namespaces in the ML schema library, and attaching the schema file of the ML Namespace to a document, whereby a pointer to the document is passed to the ML schema library as a parameter of the method;

in response to the execution of the method on the ML schema library, cause a modification to the content of at least one namespace of the schema file; and associate the modification of the ML schema file with a document to govern the application of ML elements on the document.

15. The computer system of claim 14, wherein the method causes at least one member of a group comprising: removing a namespace from the schema file, associating an XSLT transformation with the schema file, removing an association of an XSLT transformation with the schema file, associating an ML based resource with the schema file, and removing an association of an ML based resource with the schema file.

* * * * *